United States Patent [19]

Wei

[11] 4,031,299

[45] June 21, 1977

[54] PROCESS FOR FORMING A POLYVINYL CHLORIDE EXTENDER RESIN BY INCORPORATING IN THE SUSPENSION POLYMERIZATION MEDIUM A PREHOMOGENIZED SOLUTION OF A POLYALLYL COMPOUND AND A LOW MOLECULAR POLYMER OF PROPYLENE

[75] Inventor: Chung H. Wei, Wilmington, Del.

[73] Assignee: Stauffer Chemical Company, Westport, Conn.

[22] Filed: Apr. 11, 1975

[21] Appl. No.: 567,328

[52] U.S. Cl. .................. 526/193; 260/79.3 M; 526/75; 526/89; 526/204; 526/209; 526/216; 526/222; 526/261; 526/277; 526/322; 526/323; 526/332; 526/344

[51] Int. Cl.² .................. C08F 4/00; C08F 14/06; C08F 114/06; C08F 7/00

[58] Field of Search .............. 260/78.5 CL, 79.3 M, 260/80 M, 80.72, 80.76, 87.5 C, 878 R, 92.8 W; 526/344, 322, 332, 323, 261, 277, 89, 193, 204, 209, 216, 222

[56] References Cited

UNITED STATES PATENTS

| | | | |
|---|---|---|---|
| 3,112,290 | 11/1963 | Salyer | 260/87.5 C |
| 3,457,241 | 7/1969 | Nakamura et al. | 260/92.8 W |
| 3,468,840 | 9/1969 | Heiberger et al. | 260/87.5 C |
| 3,468,858 | 9/1969 | Heiberger et al. | 260/87.5 C |
| 3,609,131 | 9/1971 | Orthez et al. | 260/87.5 C |
| 3,705,883 | 12/1972 | Wingler et al. | 260/87.5 C |
| 3,813,373 | 5/1974 | Ito et al. | 526/344 |
| 3,816,565 | 6/1974 | Takahashi | 526/344 |
| 3,838,138 | 9/1974 | Langsam | 260/87.5 C |
| 3,856,767 | 12/1974 | Sturt | 526/344 |

Primary Examiner—Joseph L. Schofer
Assistant Examiner—Herbert J. Lilling
Attorney, Agent, or Firm—Richard P. Fennelly

[57] ABSTRACT

A polyvinyl chloride extender resin having an average particle size of between about 5 microns and about 50 microns can be formed by using conventional suspension polymerization procedures if a prehomogenized solution comprising an effective amount of polyallyl compound and a low molecular weight propylene polymer are incorporated in the suspension polymerization medium to control the rheological properties of the resin.

11 Claims, No Drawings

PROCESS FOR FORMING A POLYVINYL CHLORIDE EXTENDER RESIN BY INCORPORATING IN THE SUSPENSION POLYMERIZATION MEDIUM A PREHOMOGENIZED SOLUTION OF A POLYALLYL COMPOUND AND A LOW MOLECULAR POLYMER OF PROPYLENE

TECHNICAL DESCRIPTION OF THE INVENTION

Suspension polymerization of a monomer charge containing vinyl chloride monomer will generally yield a resin product having an average particle size of between about 70 and 300 microns. Such resins are unsuited for use as extender or blending resins due to their large particle size and high porosity which prevent their dispersion in vinyl plastisols or organosols. The present invention is directed to a modified suspension polymerization procedure which enables one to utilize suspension polymerization techniques to obtain a resin product having an average particle size of about 5 microns to about 50 microns which can be used as an extender or blending resin.

The basic suspension polymerization process which forms the basis of the present invention is well known in the art. Basically, such a procedure entails forming an aqueous reaction mixture of from about 25% to about 45%, by weight, of a vinyl chloride monomer charge. Such a charge comprises vinyl chloride monomer, either alone or with up to about 50%, by weight, of any of the well-recognized monomers which copolymerize with vinyl chloride monomer. Examples are such ethylenically unsaturated monomers as the aliphatic acid vinyl esters, e.g., vinyl acetate, the vinylidene halides, e.g., vinylidene chloride, the alkyl acrylates, e.g., ethyl or methyl acrylate, the alkyl methacrylates, e.g., methyl methacrylate, styrene and its derivatives, e.g., vinyl toluene, acrylonitrile and the like. The basic suspension polymerization medium also contains about 0.01% to 5%, preferably about 0.05% to about 1% by weight, of a suspending agent and about 0.01% to 3%, preferably 0.2-1%, by weight, of a monomer soluble initiator, based on the weight of monomer. Examples of suitable suspending agents are methyl cellulose, hydroxyethyl cellulose, hydroxypropyl cellulose, hydroxypropyl methyl cellulose, carboxymethyl cellulose, talc, clay, polyvinyl alcohol, gelatine and the like. Examples of suitable initiators are azobisisobutyronitrile, lauroyl peroxide, benzoyl peroxide, isopropyl peroxy dicarbonate, and the like. Polymerization is conducted by heating the above-described reaction medium at a temperature of about 45° C. to 75° C. for a period of about 2 to 12 hours with agitation being applied throughout the course of the reaction.

It has now been found that it is possible to form a vinyl chloride extender resin having an average particle size of about 5 microns to 50 microns by adding to such a polymerization medium a prehomogenized solution containing an effective amount of a polyallyl compound and a low molecular weight propylene polymer to control the rheological properties, e.g., particle size and shape and relative viscosity, of the polymer particles resulting from the process. The polyallyl compound controls the molecular weight of the particles and makes them spherical. The propylene polymer acts as a viscosity control agent during the polymerization by preventing formation of porous resin particles which would absorb water in the reactor and form a viscous suspension slurry having poor heat transfer capabilities.

It is important to the success of the present invention that the polyallyl compound and low molecular weight propylene polymer be added to the suspension polymerization medium as a pre-homogenized solution. Addition of such a solution insures ready availability of the active components of the invention to the vinyl chloride monomer charge and insures uniform results. Such a solution will comprise about 20% to about 80%, by weight, water, about 1% to about 15%, by weight, of an emulsifier which is compatible with the suspending agent to be used in the suspension medium containing the vinyl chloride monomer and from about 15% to about 70%, by weight, of both the polyallyl compound and the low molecular weight propylene polymer. The weight ratio of polyallyl compound to propylene polymer in the prehomogenized solution can range anywhere from about 1:10 to about 1:1. The amount of such prehomogenized solution which is added to the vinyl chloride suspension medium should be sufficient to add to that medium about 0.01% to about 2.0%, preferably about 0.05% to 0.20%, by weight, of polyallyl compound and about 0.01% to about 5%, preferably about 0.3% to about 0.5%, by weight, of propylene polymer, said percentages being based on the amount of vinyl chloride monomer.

The surfactants which can be used in forming the prehomogenized solution are preferably the sulfosuccinate and sulfonate emulsifiers. Examples are disodium 4-isodecylsulfosuccinamate (available as Aerosol A-268), disodium N-octadecylsulfosuccinamate, tetrasodium-N(1,2-dicarboxyethyl) N-octadecylsulfosuccinamate, the dihexyl and dioctyl esters of sodium sulfosuccinic acid, the bis tridecyl ester of sodium sulfosuccinic acid, and the sodium salt of alkylaryl polyether sulfonate.

The polyallyl compounds which may be used with the present invention are those containing two or more allyl groups and include diallyl phthalate, the preferred compound, diallyl ether, diallyl sulfide, diallyl oxalate, diallyl adipate, diallyl maleate, diallyl fumarate, triallyl cyanurate and triallyl phosphate. Such compounds, although known as regulators for the degree of polymerization in a vinyl chloride emulsion polymerization, as described in U.S. Pat. No. 3,457,241 to Nakamura et al., have been characterized as being of no utility in a suspension polymerization procedure.

The low molecular weight propylene polymers which are to be used in the present invention include the trimer, tetramer, pentamer, hexamer and heptamer of propylene and mixtures thereof. These polymeric compounds contain from about 3 to about 7 units derived from monomeric propylene. Such polymers are well known and have found use in the synthesis of a variety of detergents. They are made by polymerizing propylene, e.g., by use of a chromium pentoxide catalyst, and then fractionally distilling the desired polymer from the reaction mixture. Suitable low molecular weight propylene polymers for use in the present invention are also commercially available from Sun Chemical Co.

The process described herein yields a resin which has a particle size of about 5 microns to about 50 microns and a relative viscosity of about 1.4 to about 2.5, as measured in a 1% cyclohexanone solution at 25° C.

The present invention is exemplified by the following Examples:

EXAMPLE 1

Deionized water (2100 gal.) was charged into a reactor and was subjected to gentle agitation. To this was added 400 gal. of Methocel K-35 suspending agent solution (50 lbs. of hydroxy propylmethyl cellulose) and 200 gal. of deionized water. At this point was then added a prehomogenized solution comprising 15 lbs. of diallyl phthalate, 40 lbs. of propylene tetramer, 10 lbs. of a sulfosuccinate emulsifier (Aerosol A-268) and 50 lbs. of deionized water. The mixture was subjected to further agitation for at least 10 minutes, the temperature was brought to 121° F. (49.4° C.) and 10 lbs. of azobisisobutyronitrile (Vazo-64) catalyst was charged into the reactor which was purged one time to a vacuum of about 15–20 in. Hg. At this point 10,000 lbs. of vinyl chloride monomer was added to the reactor, and the agitator was turned on to a setting of about 170 rpm. The reactor temperature was maintained at a polymerization temperature (71° C.) for about 10 hours to yield a final product having the physical properties given in Table 1, below.

EXAMPLE 2

The same general procedure illustrated in Example 1 was used with the following ingredients:

| Ingredient | Amount |
|---|---|
| Vinyl chloride monomer | 10,000 lbs. |
| Deionized water | 2,100 gals. |
| Methocel K-35 (in 400 gal. solution)-(Dow Chem. Co.) | 50 lbs. |
| Vazo-64 (Dupont & Co.) | 11 lbs. |
| Diallyl phthalate | 20 lbs. |
| Propylene tetramer | 40 lbs. |
| Aerosol A-268 (American Cyanamid) | 10 lbs. |
| Distilled water | 50 lbs. |

The product had the physical characteristics set forth in Table 1, below:

EXAMPLE 3

A series of "one shot" polymerization procedures were run using the ingredients listed in Table 2 given below:

TABLE 2

| Ingredient (in grams) | RUNS | | | |
|---|---|---|---|---|
| | A | B | C | D |
| Vinyl chloride monomer | 9979 | 9979 | 9979 | 9979 |
| Diallyl phthalate | 5* | 5* | 15* | 20* |
| Propylene tetramer | 50* | 50* | 40* | 30* |
| Methocel K-35 (1% by wt. solution) | 9072 | 9072 | 9072 | 9072 |
| Aerosol A-268 (g. in 100 g. of H₂O) | 5* | 5* | 10* | 10* |
| Lauroyl peroxide | 15 | 20 | — | — |
| Vazo-64 initiator | — | — | 20 | 20 |
| Deionized water | 13,237 | 13,237 | 13,237 | 13,237 |
| Reactor temp. (° C.) | 71 | 71 | 71 | 71 |
| Vent pressure (psig) | 135 | 140 | 140 | 140 |

*These ingredients were added as a prehomogenized blend formed by mixing the ingredients for about 5 min. in a Hamilton Beach mixer.

The product of the present invention can be used in a large number of applications. A preferred use is in place of the suspension resin in the process described in copending U.S. application Ser. No. 506,131, filed Sept. 18, 1974 of Leroy B. Kuhn.

The product formed by this invention has a particle size of about 5 to about 50 microns, and, unlike one formed by using propylene monomer rather than the low molecular weight propylene polymer, has a non-spherical, irregular surface.

The foregoing Examples serve to illustrate certain preferred embodiments of the claimed invention. The scope of protection that is sought is set forth in the pending claims.

What is claimed is:

1. A process for forming a polyvinyl chloride extender resin by suspension polymerization of a monomer charge containing vinyl chloride which comprises incorporating in the suspension polymerization medium an effective amount of (1) a pre-homogenized solution of a polyallyl compound selected from the group consisting of diallyl phthalate, diallyl ether, diallyl sulfide, diallyl oxalate, diallyl adipate, diallyl maleate, diallyl fumarate, triallyl cyanurate and triallyl phosphate and (2) of a low molecular weight polymer of propylene for controlling the rheological properties of the polyvinyl chloride resin.

2. A process as claimed in claim 1 wherein the polyallyl compound is present from about 0.01% to about 2%, by weight of the total monomer charge.

3. A process as claimed in claim 1 wherein the polyallyl compound is diallyl phthalate.

4. A process as claimed in claim 1 wherein the propylene polymer is present from about 0.01% to about 5%, by weight of the total monomer charge.

5. A process as claimed in claim 1 wherein the propylene polymer contains from about three to about seven units derived from monomeric propylene.

TABLE 1

Physical Properties of the Resins

| EXAMPLE | Rel. Visc.* | SCREEN ANALYSIS (% RETAINED) | | | | | | | | | (g/cc.) BULK DENSITY |
|---|---|---|---|---|---|---|---|---|---|---|---|
| | | 80 Mesh | 100 Mesh | 140 Mesh | 170 Mesh | 200 Mesh | 230 Mesh | 270 Mesh | 325 Mesh | 400 Mesh | In Pan | |
| 1 | 1.83 | 0.4 | 0.2 | 2.8 | 2.3 | 5.1 | 14.6 | 20.9 | 12.0 | 14.4 | 27.3 | 0.641 |
| 2 | 2.03 | 0.0 | 0.0 | 0.5 | 1.9 | 2.1 | 11.3 | 30.7 | 11.8 | 18.0 | 23.7 | 0.510 |

*measured as a 1% by weight solution in cyclohexanone at 25° C.

6. A process as claimed in claim 1 wherein the polyallyl compound is present from about 0.05% to about 0.2%, by weight, of the total monomer charge.

7. A process as claimed in claim 1 wherein the propylene polymer is present from about 0.3% to about 0.5%, by weight, of the total monomer charge.

8. A process as claimed in claim 6 wherein the polyallyl compound is diallyl phthalate.

9. A process as claimed in claim 7 wherein the propylene polymer is a propylene tetramer.

10. A process as claimed in claim 1 wherein the polyallyl compound is from about 0.05% to about 0.2%, by weight, of diallyl phthalate and the propylene tetramer is from about 0.3% to about 0.5%, by weight, of propylene tetramer, said percents being based on the weight of the total monomer charge.

11. A process as claimed in claim 1 wherein the weight ratio of polyallyl compound to propylene polymer ranges from about 1:10 to about 1:1.

* * * * *